(12) United States Patent
Mason

(10) Patent No.: US 9,470,954 B2
(45) Date of Patent: Oct. 18, 2016

(54) CRYSTAL-PAIR COUNTER-ROTATOR WITH TRANSLATION CAPABILITY

(71) Applicant: Coherent Scotland Limited, Glasgow (GB)

(72) Inventor: Michael Mason, Glasgow (GB)

(73) Assignee: Coherent Scotland Limited, Glasgow (GB)

( * ) Notice: Subject to any disclaimer, the term of this patent is extended or adjusted under 35 U.S.C. 154(b) by 0 days.

(21) Appl. No.: 14/918,153

(22) Filed: Oct. 20, 2015

(65) Prior Publication Data

US 2016/0147130 A1   May 26, 2016

(30) Foreign Application Priority Data

Nov. 21, 2014   (GB) .................................. 1420741.9

(51) Int. Cl.
| | |
|---|---|
| *G02F 1/35* | (2006.01) |
| *G02F 1/39* | (2006.01) |
| *H01S 3/00* | (2006.01) |

(52) U.S. Cl.
CPC ........... *G02F 1/3501* (2013.01); *G02F 1/3525* (2013.01); *G02F 1/39* (2013.01); *H01S 3/0092* (2013.01); *G02F 2001/3505* (2013.01); *G02F 2001/3507* (2013.01); *G02F 2001/3546* (2013.01)

(58) Field of Classification Search
CPC ..... G02B 7/00; G02F 1/3501; G02F 1/3532; G02F 2001/3507
See application file for complete search history.

(56) References Cited

U.S. PATENT DOCUMENTS

| | | | |
|---|---|---|---|
| 3,962,576 A | 6/1976 | Kuhl et al. | |
| 5,047,668 A * | 9/1991 | Bosenberg | ................ G02F 1/39 359/330 |
| 5,260,953 A | 11/1993 | Rowe | |
| 5,646,764 A | 7/1997 | Moore et al. | |
| 6,011,809 A * | 1/2000 | Tosaka | ....................... G02F 1/39 359/330 |
| 7,136,403 B2 * | 11/2006 | Reid | ..................... G02F 1/3501 359/326 |
| 2009/0245297 A1 * | 10/2009 | Richter | ................. G02F 1/3501 372/21 |
| 2015/0131068 A1 | 5/2015 | Takada | |

FOREIGN PATENT DOCUMENTS

| | | |
|---|---|---|
| CN | 2618339 Y | 5/2004 |
| JP | 04257283 A | 9/1992 |
| WO | 2013133278 A1 | 9/2013 |

OTHER PUBLICATIONS

Combined Search and Examination Report under Sections 17 and 18(3), received for GB Patent Application No. 1420741.9, mailed on May 7, 2015, 5 pages.
International Search Report and Written Opinion received for PCT Patent Application No. PCT/GB2015/053556, mailed on Feb. 16, 2016, 12 pages.

* cited by examiner

*Primary Examiner* — Daniel Petkovsek
(74) *Attorney, Agent, or Firm* — Morrison & Foerster LLP

(57) ABSTRACT

In an optical parametric frequency conversion arrangement first and second optically nonlinear crystals (18, 20) mounted on respectively first and second drive-shafts (26, 30). The drive shafts (26, 30) are counter-rotatably driven by a single stepper-motor (50) via a gear-train. The first drive-shaft (26) includes a lead screw. When the first drive-shaft (26) is rotated, the first crystal (18) is rotated and simultaneously translated, while the second crystal (20) is simultaneously counter-rotated but is not translated.

7 Claims, 4 Drawing Sheets

CRYSTAL-PAIR COUNTER-ROTATOR WITH TRANSLATION CAPABILITY

CROSS REFERENCE TO RELATED APPLICATION

This application claims the priority benefit of United Kingdom Patent Application No. GB1420741.9, filed on Nov. 21, 2014, the content of which is incorporated by reference herein in its entirety for all purposes.

TECHNICAL FIELD OF THE INVENTION

The present invention relates in general to laser apparatus including frequency-conversion by one or more optically nonlinear crystals. The invention relates in particular to an optical parametric oscillator (OPO) tuned by varying the incidence angle of a beam on a pair of optically nonlinear crystals arranged for walk-off compensation.

In such an arrangement, it is usual to a have second optically nonlinear crystal (compensating crystal) counter-rotatable toward or away from the OPO crystal, for providing walk-off compensation and canceling changes in beam pointing resulting from rotating the OPO crystal. The counter rotation is preferably done simultaneously by a common stepper motor rotating both crystals using suitable gearing. The OPO and compensation crystals can be referred to as a crystal-pair.

In such an OPO, the pump-radiation is focused to a beam-waist in the OPO crystal for maximizing electric field intensity and corresponding increasing parametric conversion efficiency. Because of this, depending on the pump-wavelength and power, it is not unusual for optical damage to gradually occur on the OPO crystal. Damage does not usually occur in the compensation crystal as the beam-diameter has expanded from the beam-waist and the electromagnetic field intensity is consequently reduced below a damage threshold.

In any frequency conversion arrangement an unavoidable problem of optical damage to an optically nonlinear crystal can be mitigated by periodically moving (shifting) the crystal with respect to an incident beam. This is usually termed "crystal-shifting" by practitioners of the art. The period can be selected, for example, by monitoring output power and shifting the crystal when power has fallen by some predetermined percentage.

When only a single crystal is involved, with a fixed (non-tunable) conversion, the crystal can be mounted on a simple, small translation-stage and translated in one or two axes. In the case of the above described counter-rotatable crystal-pair, the shifting arrangement including motor, gearing, and crystals has to be shifted. This requires a much bigger, and consequently more expensive and space-consuming, translation stage.

Separate stepper-motors and associated control systems would be needed for crystal rotation and crystal shifting. There is a need for a simpler arrangement for the crystal-shifting which does not require such a translation stage, and does not require separate motors and control systems.

SUMMARY OF THE INVENTION

In one aspect, opto-mechanical apparatus in accordance with the present invention comprises first and second optically nonlinear crystals mounted on respectively first and second drive-shafts, having respectively first and second rotation-axes. The drive-shafts are counter-rotatably driven by a stepper-motor via a gear-train.

Only the first drive-shaft includes a lead-screw arranged such that when the first drive-shaft is rotated, the first crystal is rotated about the first rotation-axis and simultaneously translated in the direction of the first rotation-axis, while the second crystal is simultaneously counter-rotated about the second rotation-axis, but is not translated in the direction of the second rotation-axis.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain principles of the present invention.

DETAILED DESCRIPTION OF THE INVENTION

Figure 1:
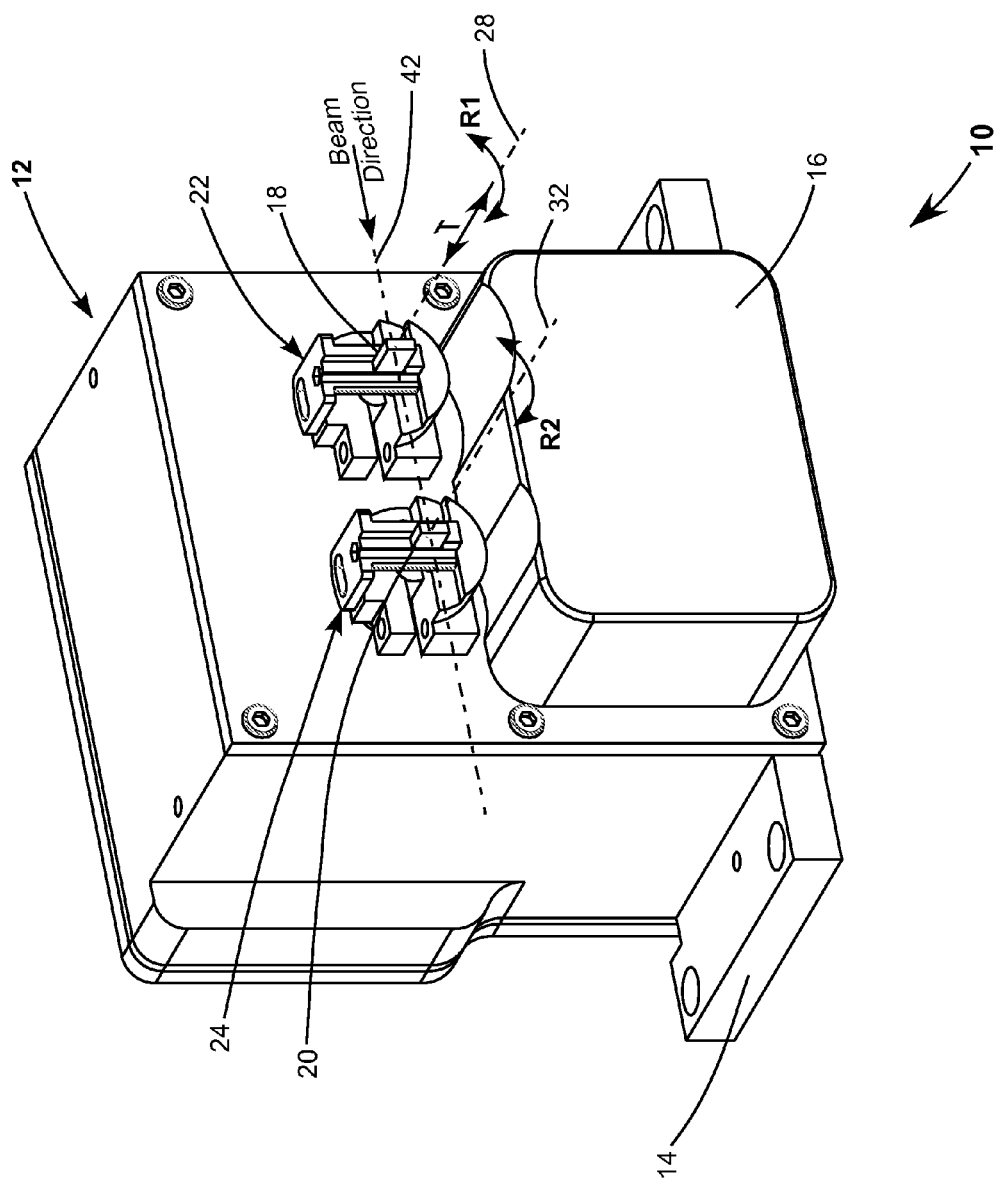
FIG. 1 is a three-dimensional view schematically illustrating a preferred embodiment of apparatus in accordance with the present invention including a housing including mechanisms (not shown) for rotating first and second drive-shafts on which are mounted respectively first and second crystal holders supporting respectively first and second optically nonlinear crystals with the drive-shafts counter-rotatable with respect to each other and with the first drive-shaft simultaneously translatable about a drive-shaft axis thereof.
Figure 1A:
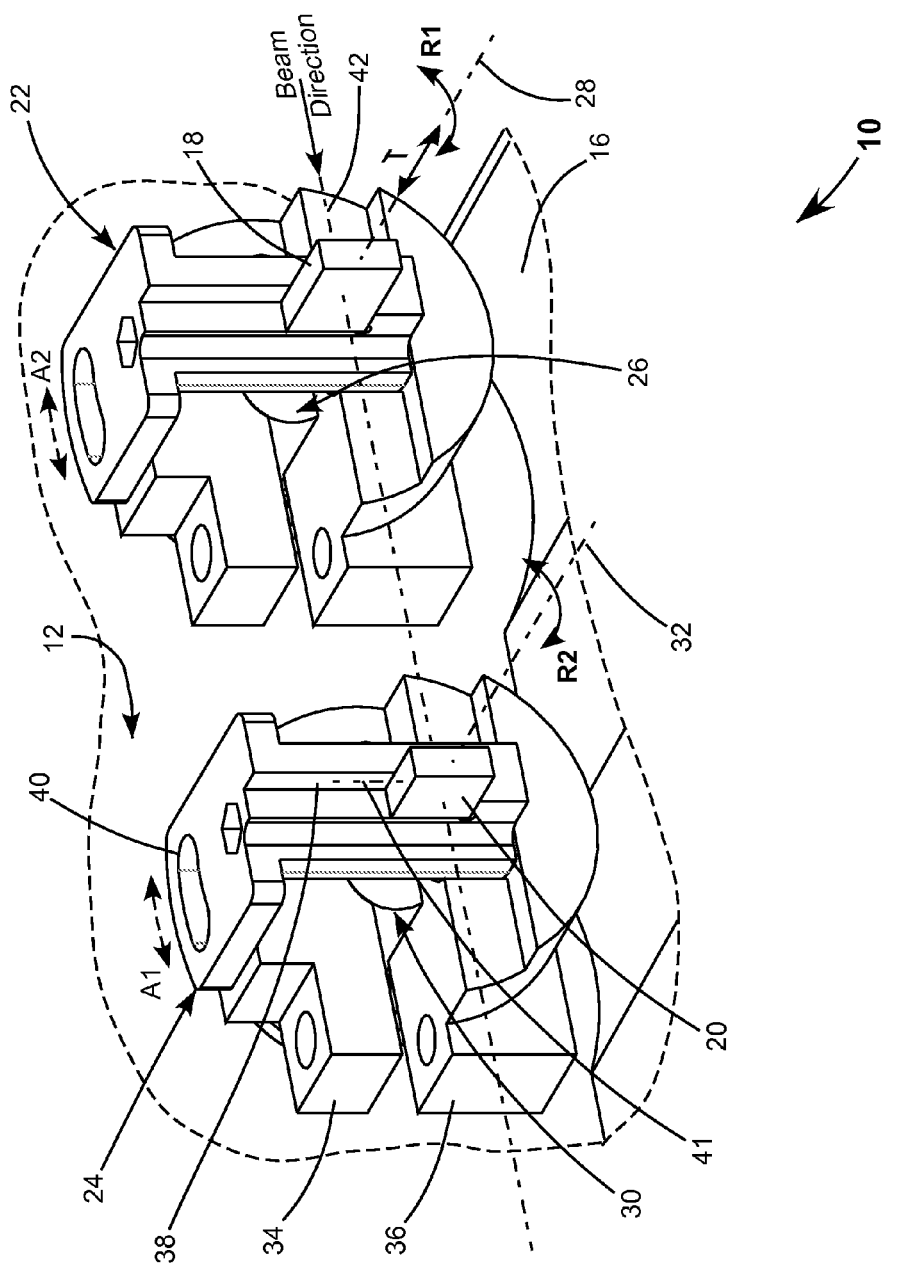
FIG. 1A is a three-dimensional view schematically illustrating details of the crystal holders and crystals of the apparatus of FIG. 1.

Turning now to the drawings, wherein like features are designated with like reference numerals. FIG. 1 and FIG. 1A schematically illustrate a preferred embodiment 10 of crystal rotating and shifting apparatus in accordance with the present invention. The embodiment is described with to use thereof in an above-discussed OPO.

Apparatus 10 includes a housing 12 having an extension portion 16. The housing includes a base flange 14 for mounting the apparatus in an OPO apparatus. Within the housing, not shown in either FIGS. 1 and 1A, is a single stepper-motor and gearing arranged to simultaneously counter-rotate drive-shafts 26 and 30 about drive-shaft axes 28 and 32 respectively (see FIG. 1A), as indicated by arrows R1 and R2 respectively. The mechanism also simultaneously translates drive-shaft 26 in the drive-shaft axis direction as indicated by arrows T. Details of the mechanism are described in detail further herein below with reference to FIG. 2 and FIG. 2A.

Optically nonlinear crystals 18 and 20 are supported on crystal holders 22 and 24 respectively. In terms of the background art discussed above, crystal 18 is an OPO crystal in which a beam being frequency-divided (parametrically converted) is focused.

Crystal 20 is a compensating crystal. The direction of incidence of a laser beam being frequency-divided is indicated as such. The propagation axis of the beam is indicated as axis 42. It should be noted that OPO crystal 18 is longer than crystal 20 in the drive-shaft axis direction to accommodate translation of the crystal as drive-shaft 26 is translated.

Referring now principally to FIG. 1A, each crystal holder is attached to an upper clamp-member 34 via a screw (not shown) through an arcuate slot 40 in the crystal holder. The upper clamp-member is clamped to a lower clamp-member by a screw (also not shown). This serves to attach the crystal holders to the drive-shafts. The crystals are edge-bonded to the crystal holders on a shelf-portion 38 thereof. In the drawing of FIG. 1A, the crystal holders and clamp-members are identical. Reference numerals are provided for only one, for simplicity of illustration. Attaching crystal holders to the clamp via arcuate slots 40 allows the crystals to be initially aligned with each other during manufacture, as indicated by arrows A1 and A2 and an axis 41 perpendicular to the drive shaft-axis. This is a one-time manual alignment, which is made during assembly of the inventive apparatus, then fixed. For this reason, the adjustment arcs A1 and A2 are indicated by a dashed line.

Figure 2:
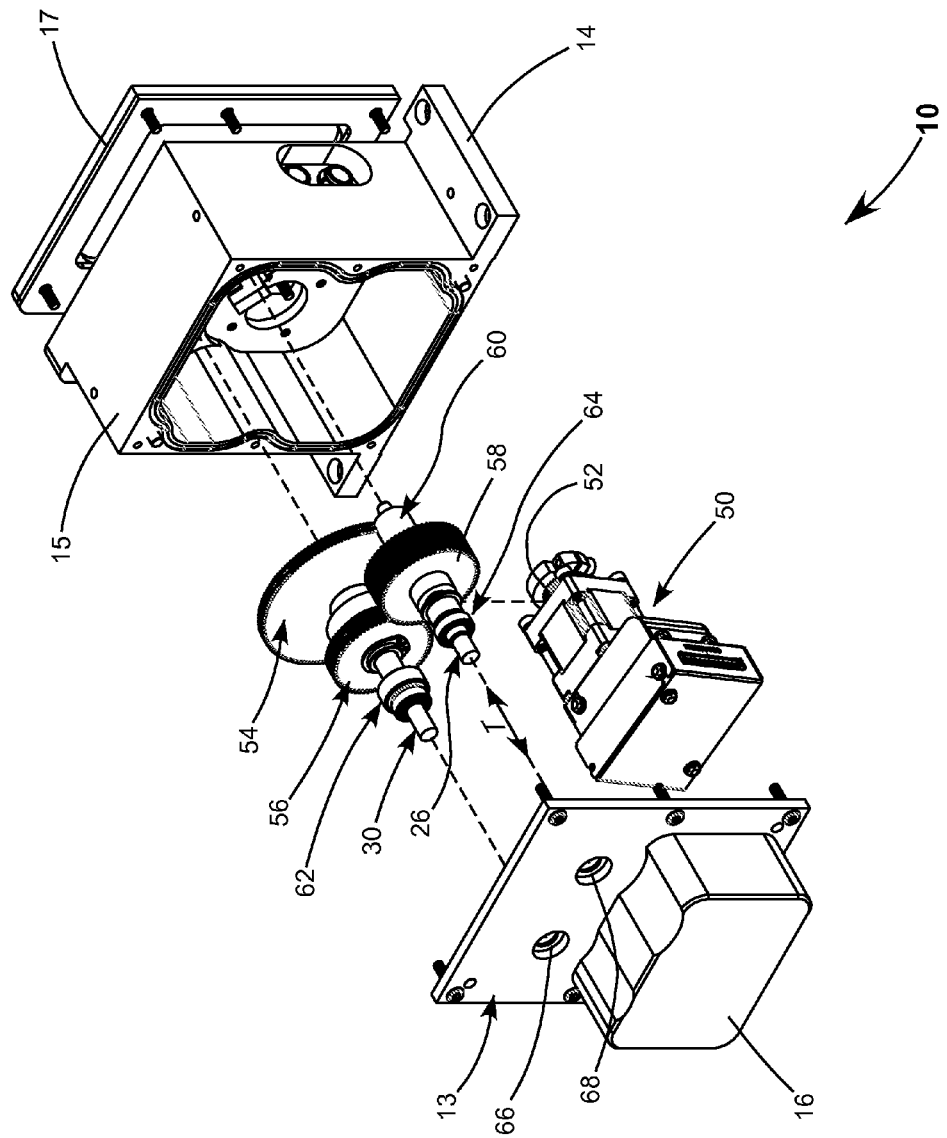
FIG. 2 is an exploded three-dimensional view schematically illustrating details of the rotating and translating mechanisms not shown in FIG. 1.

FIG. 2 is an exploded three-dimensional view schematically illustrating details of the rotating and translating mechanisms not shown in FIG. 1. Further detail of the mechanisms is depicted as sub-assembly 10A in FIG. 2A.

In FIG. 2, housing 12 is disassembled into a front cover 13 including extended section 16 discussed above, a machined surround section 15 including base 14, and a rear cover 17. Holes 66 and 68 through cover 13 are provided to engage bearings (bushings) 62 and 64 on drive-shafts 30 and 26 respectively.

A stepper motor 50 is depicted withdrawn from extended section 16 of front cover 13. Stepper motor 50 turns a gear 52, which engages a larger-diameter gear 54 connected to drive-shaft 30. Gear 54 is an anti-backlash gear having two components gears 54A and 54B, one thereof fixed and one floating under spring pre-load as is known in the art. In the drawing, gear 54B is the spring loaded gear. Rotation of drive shaft 30 rotates crystal holder 24.

Also attached to drive-shaft 30 is an anti-backlash gear 56 having component gears 56A and 56B. In the drawing, gear 56B is the spring loaded gear. Gear 56 engages a gear 58 having the same diameter as gear 56, but a greater thickness. Gear 58 is connected to drive shaft 26 via a lead-screw assembly 60. This provides that when gear 58 is rotated by gear 56 drive, shaft 26 and crystal holder 22 thereon are rotated, in a direction opposite to crystal holder 24 and through exactly the same angle. Further, because of the lead screw assembly, rotation of the draft shaft 26 causes the crystal holder to be translated as indicated by arrows T. The anti-backlash gear arrangement of gears 54 and 56 is critical in ensuring that the rotation angles are indeed exactly the same, and exactly repeatable.

Figure 2A:
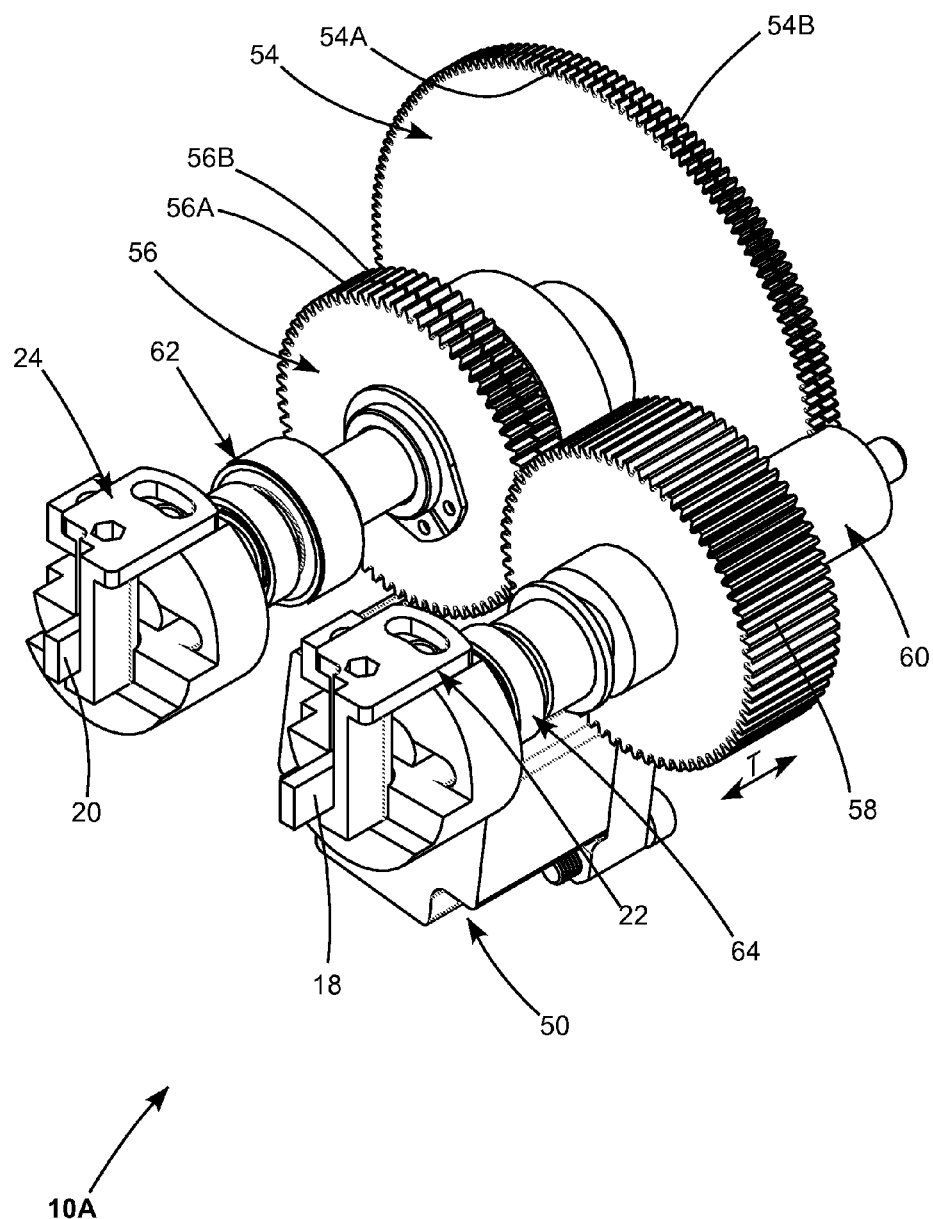
FIG. 2A is an expanded three-dimensional sub-assembly view schematically illustrating further details of the mechanisms of FIG. 2.

A preferred thread-pitch for lead screw 60, in this embodiment of the present invention, is 125 µm, corresponding to 200 turns-per-inch (TPI). About 5 mm of travel is required. Lead-screws can be custom-made by most precision machine-shops. "Off-the-shelf" lead-screw assemblies are also commercially available. By way of example, a Model AJS254-0.5H-NL lead screw, available from Newport Corporation of Irvine, Calif. has a thread pitch of 254 TPI. It should be noted here, that in the arrangement described, gear 58 translates with lead screw 60 and drive shaft 26, as indicated in FIG. 2A by arrow T. The additional thickness of gear 58 over gear 56 is made sufficient that gears 56 and 58 stay meshed through the contemplated translation range of drive-shaft 26. In an example of operation of the inventive crystal shifter it is useful to consider an OPO pumped at a wavelength of 520 nanometers (nm) with signal radiation tunable through a range between about 680 nm and about 1300 nm. For optically nonlinear crystals 18 and 20 of β-barium borate (BBO), this requires rotating each crystal (in opposite directions) through a total angle of about 24 degrees. With the preferred lead-screw pitch of 200 TPI, this would translate crystal 20 a distance of only about 8 micrometers (µm). A typical 1/e2 beam-waist diameter in OPO crystal 18 would be about 60 µm, so there would always be a substantial degree of overlap of extreme-tuned positions of the beam-waist.

When a need for shifting the beam waist to a completely fresh spot on the crystal is indicated, for example, by a detected unacceptable power-drop as discussed above, the crystals are rotated through one or more revolutions of about 360°, bringing the crystal angles back into the tuning range. Considering again the preferred 200 TPI lead screw, one full 360°-revolution of drive-shaft 26 would translate crystal 18 a distance of about 125 µm. This is sufficient to shift the 60 µm beam-waist to a completely fresh spot on OPO crystal 18.

In the embodiment of the present invention described above, crystal rotation for tuning purposes and crystal translation of crystal shifting are achieved with a single stepper motor which can be driven by a single control system. This provides for a considerable reduction in size and complexity compared with the above described prior-art approach, even with translation in only one axis.

The embodiment of the invention is illustrated by detailed engineering drawings prepared for building a prototype of the invention. Only those details necessary for understanding principles of the present invention are described and identified by reference numerals. From the quality of the drawings, the function of other details not described will be evident to a person of ordinary skill in the mechanical engineering art. The details are not intended to be limiting, and a person of such ordinary skill in the mechanical engineering art may make changes to the details, whether described or not described, without departing from the spirit and scope of the present invention.

In summary, the present invention is described above in terms of a preferred embodiment. The invention is not limited, however, by the embodiment described and depicted. Rather the embodiment is limited only by the claims appended hereto.

What is claimed:

1. An opto-mechanical apparatus, comprising:
   first and second optically nonlinear crystals mounted on respective first and second drive-shafts said first drive-shaft having a first rotation axis and said second drive-shaft having a second rotation axis;
   the drive shafts being counter-rotatably driven by a stepper-motor via a gear-train; and wherein only the first drive-shaft includes a lead-screw arranged such that when the first drive-shaft is rotated, the first crystal is rotated about the first rotation-axis and simultaneously translated in a direction along the first rotation-axis, while the second crystal is simultaneously counter-rotated about the second rotation-axis, but is not translated in a direction along the second rotation-axis.

2. The apparatus of claim 1, wherein the gear-train includes a first gear turned by the stepper motor, the first gear engaging a second gear attached to the second drive-shaft, said gear-train further including a third gear mounted on the second-drive shaft and engaging a fourth gear mounted on the lead-screw for rotating and translating the first drive shaft.

3. The apparatus of claim 2, wherein the second gear has a diameter larger than that of the first gear, the third gear has a diameter smaller than the second gear, and the third and fourth gears have the same diameter, whereby the drive first and second drive-shafts rotate through the same angle but in opposite directions.

4. The apparatus of claim 3, wherein the second and third gears are anti-backlash gears.

5. The apparatus of claim 3, wherein the lead-screw has a thread pitch of 0.125 micrometers.

6. The apparatus of claim 3, further including first and second crystal holders mounted on respectively the first and second drive-shafts, the first and second crystal holders holding respectively first and second crystals.

7. The apparatus of claim 6, wherein the first and second crystal holders are configured to allow manual alignment of the first and second crystal with each other about an axis perpendicular to the rotation axis.

* * * * *